(12) United States Patent
Heikkila (10) Patent No.: US 6,771,690 B2
(45) Date of Patent: Aug. 3, 2004

(54) METHOD AND APPARATUS FOR PROVIDING BLIND ADAPTIVE ESTIMATION AND RECEPTION

(75) Inventor: Markku J. Heikkila, Oulu (FI)

(73) Assignee: Nokia Corporation, Espoo (FI)

( * ) Notice: Subject to any disclaimer, the term of this patent is extended or adjusted under 35 U.S.C. 154(b) by 371 days.

(21) Appl. No.: 09/751,973

(22) Filed: Dec. 29, 2000

(65) Prior Publication Data

US 2002/0122470 A1 Sep. 5, 2002

(51) Int. Cl.$^7$ ................................................. H04B 1/69
(52) U.S. Cl. ........................ 375/147; 375/130; 375/148; 375/152; 370/335; 370/342
(58) Field of Search ................................. 375/147, 148, 375/130, 140, 145, 146, 152; 370/342, 335

(56) References Cited

U.S. PATENT DOCUMENTS

| | | | | |
|---|---|---|---|---|
| 5,377,226 A | * | 12/1994 | Davis | 370/340 |
| 5,790,537 A | * | 8/1998 | Yoon et al. | 370/342 |
| 6,011,812 A | * | 1/2000 | Laakso et al. | 375/152 |
| 6,377,611 B1 | * | 4/2002 | Hwang | 375/140 |

OTHER PUBLICATIONS

Heikkila et al., Interference Suppression in CDMA Downlink through Adaptive Channel Equalization, IEEE VTS 50th, vol. 2, pp. 978–982, 1999.*

Zheng, F.C., A linear CDMA detector based on minimum variance distortioless response (MVDR), Vehicular Technology Conference Proceedings, 2000 IEEE 51$^{st}$ Meeting, vol. 1, pp. 566–570, May 2000.*

Komulainen et al., "Adaptive Channel Equalization and Interference Suppression for CDMA Downlink", IEEE 6$^{th}$ Int. Symp. on Spread–Spectrum Tech & Appl.. NJIT, 6$^{th}$ ISSSTA, pp. 363–367, 2000.

Hwang et al., "Adaptive Variable Step–Size Griffiths' Algorithm for Blind Demodulation of DS/CDMA Signals", IEICE Transactions on Communication, vol. E82–B, No. 10, 1999.

* cited by examiner

Primary Examiner—Shuwang Liu
(74) Attorney, Agent, or Firm—Harrington & Smith, LLP (57) ABSTRACT

A method is disclosed to minimize the mean-square-error of an estimate of an unknown parameter, such as a data symbol transmitted through a channel, such as a WCDMA channel. The method includes steps of (a) replacing a required multiplication of an input signal vector by an inverse covariance matrix, which is one of a total signal covariance matrix or an interference-plus-noise covariance matrix, by linear filtering, wherein directly computed or estimated filter elements of a row or a column of the inverse covariance matrix, corresponding to time instant i, are used as linear filter coefficients; (b) forming a vector g(i) from the filter outputs, the vector g(i) being estimated element by element using the linear filter; and (c) using the vector g(i) in place of a vector that would have been obtained by directly multiplying the signal vector by the inverse covariance matrix. The linear filter w(i) converges or closely converges to a row or column of the required inverse covariance matrix. For the case of the interference-plus-noise covariance matrix, when a desired filter is found through adaptation, the desired filter is used to filter the total signal, including the desired signal, to generate the output vector g(i). The filter outputs generated using either of the total signal covariance matrix or the interference-plus-noise covariance matrix are employed to estimate an unknown parameter through the use of a further filter matched to the pulse shape of the unknown parameter carried by the input signal, where the further filter is a RAKE receiver that performs multipath combining at a chip level and single code correlation, or a RAKE receiver that performs despreading using a code correlator bank, and multipath combining at the symbol level using the correlator outputs.

15 Claims, 8 Drawing Sheets

FIG.11B
TWO ANTENNAS

FIG.11A
ONE ANTENNA $$\begin{pmatrix} r(i-P) \\ \vdots \\ r(i+Q) \end{pmatrix} = \begin{pmatrix} \cdots & h_1(i-1) & h_1(i) & h_1(i+1) & \cdots \\ \cdots & h_2(i-1) & h_2(i) & h_2(i+1) & \cdots \\ & \vdots & \vdots & \vdots & \\ \cdots & h_{P+1+Q}(i-1) & h_{P+1+Q}(i) & h_{P+1+Q}(i+1) & \cdots \end{pmatrix} \begin{pmatrix} \vdots \\ b(i-1) \\ b(i) \\ b(i+1) \\ \vdots \end{pmatrix} + \begin{pmatrix} n(i-P) \\ \vdots \\ n(i+Q) \end{pmatrix} \Leftrightarrow$$

$$r(i) = (\cdots \ h(i-1) \ h(i) \ h(i+1) \ \cdots) \ b(i) + n(i) = H(i)b(i) + n(i)$$

FIG.9A $$\hat{b}(i) = \sigma_b^2 h^H(i)(C_{rr}(i))^{-1} r(i) = w_{LMMSE}^H(i)r(i)$$ FIG.9B $$C_{rr}(i) = E[r(i)r^H(i)]$$ FIG.9C $$w(0) \Big|_{i=0} = \begin{pmatrix} \omega_{-P} \\ \vdots \\ \omega_0 \\ \vdots \\ \omega_Q \end{pmatrix} + \begin{pmatrix} 0_P \\ 1 \\ 0_Q \end{pmatrix}$$ (OR SOME OTHER INITIAL GUESS)

FIG.9D $$\hat{g}(i) = w^H(i)r(i) = \sum_{\Delta i=-P}^{Q} \omega_{\Delta i}^* r(i+\Delta i)$$ FIG.9E $$w(i+1) = w(i) + \mu(i) \left[ \begin{pmatrix} 0_P \\ a \\ 0_Q \end{pmatrix} - \hat{g}^*(i)r(i) \right]$$ FIG.9F $$\omega_k(i+1) \leftarrow 1/2(\omega_k(i+1)+\omega_{-k}^*(i+1))$$
$$\omega_{-k}(i+1) \leftarrow \omega_k^*(i+1) \quad \text{FIG.9G}$$

$$\mu(i) = \frac{\mu}{\alpha + r^H(i)r(i)} \quad \text{FIG.9H}$$

$$w_1(0) = \begin{pmatrix} 0_P \\ 1 \\ 0_Q \\ 0_{P+1+Q} \end{pmatrix}, \quad w_2(0) = \begin{pmatrix} 0_{P+1+Q} \\ 0_P \\ 1 \\ 0_Q \end{pmatrix} \text{ (OR SOME OTHER INITIAL GUESS)}$$
$$i=0 \quad \text{FIG.9I}$$

$$\hat{g}_1(i) = w_1^H(i)\begin{bmatrix} r_1(i) \\ r_2(i) \end{bmatrix}, \quad \hat{g}_2(i) = w_2^H(i)\begin{bmatrix} r_1(i) \\ r_2(i) \end{bmatrix} \quad \text{FIG.9J}$$

$$w_1(i+1) = w_1(i)+\mu(i)\left[\begin{bmatrix} 0_P \\ a \\ 0_Q \\ 0_{P+1+Q} \end{bmatrix} - \hat{g}_1^*(i)\begin{bmatrix} r_1(i) \\ r_2(i) \end{bmatrix}\right]$$

$$w_2(i+1) = w_2(i)+\mu(i)\left[\begin{bmatrix} 0_{P+1+Q} \\ 0_P \\ a \\ 0_Q \end{bmatrix} - \hat{g}_2^*(i)\begin{bmatrix} r_1(i) \\ r_2(i) \end{bmatrix}\right] \quad \text{FIG.9K}$$

$$r(i) = (\cdots\ h(i-1)\ h(i)\ h(i+1)\ \cdots)(\cdots\ s(i-1)\ s(i)\ s(i+1)\ \cdots)\begin{pmatrix} \vdots \\ b(i-1) \\ b(i) \\ b(i+1) \\ \vdots \end{pmatrix} + n(i)$$

$$= G(i)S(i)b(i) + n(i) \in \mathbb{C}^{(P+1+Q)}$$

FIG.9L

$$w(0) = \begin{pmatrix} 0_P \\ 1 \\ 0_P \end{pmatrix} \text{ (OR SOME OTHER INITIAL GUESS)}$$
$$i = 0$$

FIG.9M

$$\hat{g}(i) = w^H(i)r(i) = \sum_{\Delta i=-P}^{P} \omega_{\Delta i}^* r(i+\Delta i)$$

$$\hat{g}(i) = (\hat{g}(i-2P) \cdots \hat{g}(i-P) \cdots \hat{g}(i))^T$$

FIG.9N

$$w(i+1) = 1/\gamma_1 \left[ w(i) - \frac{\hat{g}^*(i-P)}{\text{Re}(r^H(i-P)\hat{g}(i-P)) + \gamma_2} g(i) \right]$$

FIG.9O

$$\omega_k(i+1) \leftarrow 1/2(\omega_k(i+1) + \omega_{-k}^*(i+1))$$
$$\omega_{-k}(i+1) \leftarrow \omega_k^*(i+1)$$

FIG.9P

$$\hat{b}(i) = \sigma_b^2 S^H(i) G^H(i) (C_{rr}(i))^{-1} r(i) = w_{LMMSE}^H(i) r(i)$$

METHOD AND APPARATUS FOR PROVIDING BLIND ADAPTIVE ESTIMATION AND RECEPTION

FIELD OF THE INVENTION

This invention relates generally to estimating an unknown, random parameter in a linear system in the minimum mean-square-error (MSE) sense, and adapting the estimator according to gradual changes in the system. It also relates to the application of estimation algorithms to digital radio communications, more particularly to implementation of low-complexity adaptive Linear Minimum Mean Square Error (LMMSE) wireless terminal receivers for, by example, Code Division, Multiple Access (CDMA) systems, including Wideband CDMA (WCDMA) systems.

BACKGROUND OF THE INVENTION

The capacity of WCDMA systems is inherently interference limited. Users are separated by spreading codes which are orthogonal to one other. However, this orthogonality is lost at the receiver when there is multipath propagation in the channel that results in multiple-access interference. This interference is particularly severe for high data rate users that use very short spreading codes. Moreover, neighboring cells in a WCDMA system use the same frequency band, which results in significant inter-cell interference. The currently used CDMA receiver is the well-known RAKE-type. However, the use of the RAKE receiver is optimal only when there is no multipath propagation and the interference is "white". Unfortunately, such conditions occur only rarely, thus making the RAKE a sub-optimal receiver.

The RAKE receiver used for WCDMA terminal receivers has no capability to reduce the interference caused by multipath propagation, and furthermore it cannot utilize the structure of the interference, i.e. its spatial and time-correlation properties. In a highly loaded cell, or with strong interference from neighboring cells, RAKE receiver does not function properly. Furthermore, if multiple wireless terminal antennas are used the RAKE receiver cannot intelligently direct the beam of the antenna array so that the signal-to-interference-plus-noise ratio (SINR) would be maximized.

The most optimum linear receiver, in the minimum mean-square-error (MMSE) sense, is well-documented in the literature, but too complex to be implemented in most applications.

In the literature, almost all algorithms used for finding the LMMSE solution are either too complex to implement in a practical receiver, and/or require a suitable training sequence. However, a suitable training sequence is not present in the third generation CDMA systems.

One problem that is common to most adaptive algorithms is that they are designed to operate on the symbol level. However, due to the long scrambling codes used in the WCDMA system the symbol level algorithms do not function properly. This is due to the fact that the scrambling code makes the signal non-cyclostationary on the symbol level. In other words, scrambling randomizes the signal correlation properties, thereby making adaptation impossible.

This problem can be avoided when the filter is designed to operate on the chip level, as opposed to the symbol level. However, due to the lack of a suitable training sequence on the chip level, the adaptation algorithm must be blind. Only a few practical algorithms for this purpose have thus far been developed or proposed.

One improved adaptive algorithm known to the inventors is the so-called Griffiths' algorithm. This algorithm uses the channel impulse response to train the filter. However, training is still required, and the adaptation time may not be optimum for all applications.

OBJECTS AND ADVANTAGES OF THE INVENTION

It is a first object and advantage of this invention to provide an adaptive filter that eliminates the requirement to multiply by the inverse of the covariance matrix.

It is a further object and advantage of this invention to provide an adaptive filter that has computation requirements that are suitable for use in a wireless terminal, such as a WCDMA terminal, that employs one or more antennas.

It is another object and advantage of this invention to provide an adaptive finite impulse response (FIR) filter that does not require the use of a training sequence, and that is suitable for use in a wireless terminal, such as a WCDMA terminal, employing at least one reception antenna.

SUMMARY OF THE INVENTION

The foregoing and other problems are overcome and the foregoing objects and advantages are realized by methods and apparatus in accordance with embodiments of this invention.

This invention provides an algorithm that is embodied as an adaptive linear finite impulse response (FIR) filter which can be applied to determine a linear minimum mean-square-error (LMMSE) estimate of unknown, random parameters. Whereas the direct computation of the LMMSE solution is very complex and requires inversion of a large matrix, the complexity of the adaptive algorithm of this invention is of the order of the well known and significantly less complex Least Mean Square (LMS) algorithm.

The presently preferred adaptive FIR filter is blind, i.e., it does not require any training for the adaptation, which makes it applicable in, by example, WCDMA downlink receivers with one or multiple antennas. It is shown that the performance of the adaptive WCDMA terminal receiver is superior to the currently used RAKE receiver.

In general, the invention provides an adaptive algorithm which can be used to derive a linear filter which minimizes the mean-square-error of the estimate of some unknown parameter such as, but not limited to, a transmitted data symbol. Due to the adaptive processing, the high computational complexity required by the conventional direct solution for the optimal filter is avoided. The algorithm is applicable for use in advanced third generation wireless terminal receivers, as it does not require any training for the adaptation.

The adaptive algorithm in accordance with the teachings herein can be used to find a linear MMSE (LMMSE) solution with low computational requirements. When applied to WCDMA receivers, the adaptive LMMSE algorithm in accordance with these teachings equalizes the channel so that the interference from other users is minimized. In addition, due to the inherent whitening operation performed by the adaptive filter, the interference from neighboring cells is effectively suppressed. At the same time, the adaptive receiver is able to (near-)optimally perform beam steering in the case of a multi-antenna receiver.

Performance results show that the adaptive LMMSE receiver clearly outperforms the conventional RAKE receiver. The improved performance can be used to increase the reception reliability of the wireless terminal receiver, especially in severe interference conditions, or to increase the cell coverage, or the capacity of the system.

Unlike the Griffiths' algorithm approach, in the adaptive algorithm of this invention the LMMSE estimator is divided into a blind adaptive filter and a filter matched to the channel impulse response and to the spreading code of the desired user. Thus no training is required at all.

In the case of significant multipath propagation, or very short spreading codes (high data rates), or a highly loaded home cell, or high interference from a neighboring cell, the adaptive receiver in accordance with this invention is shown to be superior to the conventional RAKE receiver.

The adaptive filter can, however, be used prior to a RAKE receiver, thereby causing the overall receiver to function as an adaptive LMMSE receiver that converges to an optimal linear receiver in the sense of minimizing the signal-to-noise-plus-interference ratio at the receiver output. If the adaptive filter portion is by-passed for some reason, for example to save power when experiencing good channel conditions, the receiver then functions as a conventional RAKE receiver.

The adaptive receiver has an inherent capability to (asymptotically) optimally perform beam forming, if the receiver has multiple antennas. Thus, if adaptive filtering is used in a multi-antenna receiver prior to a conventional multi-antenna RAKE, the overall receiver functions as an adaptive LMMSE receiver and performs beamforming in an optimal way. A RAKE receiver alone would perform this task suboptimally, unless additional algorithms are utilized.

The adaptive algorithm has a very simple structure. Because the reference vector used for the adaptation has only one non-zero element, the algorithm is actually less complex than the well-known LMS, which cannot be used in any case due to the lack of a reliable training sequence.

The adaptive algorithm is stable with mild requirements, and it converges to a known, optimal solution. For certain earlier ad hoc algorithms the stability was not guaranteed and they did not necessarily exhibit global convergence.

In case of a single receiver antenna, the adaptive filter may be symmetric with respect to a center filter tap, which can be utilized to make the adaptation speed of the algorithm faster.: Note should be made that the "center tap" is not necessarily the middle-most tap because, in general, one may have P+1+Q taps in the filter. Thus, the symmetry may hold with respect to the P+1'th filter tap. The filter is not symmetric if multiple antennas are used.

Disclosed herein is a general method to replace the operation of multiplying a received signal sample vector by an inverse covariance matrix of the input signal or by an inverse covariance matrix of the additional interference-plus-noise in the input signal (i.e., the input signal minus the desired signal). This type of matrix-vector multiplication is required in many well-known estimator structures as a part of the estimation algorithm (such as in the LMMSE estimator). The general method includes steps of: (a) estimating a row or a column of an inverse of a covariance matrix; and (b) using the elements of the estimate of the row or column vector as coefficients in a linear filter which is used to filter the input signal samples. In the presently preferred embodiment a received signal comprises a series of modulated pulse shapes, such as data symbol pulse shapes, each carrying an unknown parameter, such as a data symbol, and noise.

The filter coefficients form a vector w(i) which is an estimate of a row or a column of an inverse of the covariance matrix corresponding to a time interval i of the received signal. The estimation of w(i) can be based on an estimation of the signal covariance matrix, and then the use of an algorithm to compute the inverse of this matrix taking into account that only a row or column of the inverse is required. The step of filtering forms a filter output g(i) (scalar value). Consecutive filter outputs can be used to replace the vector that would be obtained by multiplying the received input signal vector by an inverse covariance matrix.

Also disclosed is a blind adaptive method to find the filter, whose coefficients given by vector w(i) converge to a row or column of the covariance matrix inverse. This method includes steps of: (a) initializing the linear filter using the best available a priori knowledge about the row or column of the inverse covariance matrix of interest; (b) generating a filter output g(i); and (c) adaptively updating the filter coefficients so that the filter converges towards a row or column of the inverse covariance matrix of interest.

In general, one may be interested in the inverse covariance matrix of the total received signal or in the inverse covariance matrix of the interference-plus-noise only (e.g. if the desired signal component is excluded or has first been subtracted from the total signal.

When the goal is to estimate a row or a column of an inverse covariance matrix, it may first be necessary to construct or estimate the covariance matrix itself. Further in this regard, as aspect of this invention is a method of using a row or a column of the inverse covariance matrix as a filter. This approach will, in most cases, reduce the computational complexity, which is an important consideration in power and resource-limited mobile electronics platforms, such as cellular telephones, PDAs, and personal communicators.

When the blind adaptive filter is used, the covariance matrix need not to be constructed or estimated separately to find a row or column of the inverse covariance matrix. In this case the adaptive filter adapts so that the filter coefficients (filter coefficients stacked into a vector) form an estimate of a row or column of the inverse covariance matrix.

Conventionally, one would first estimate the covariance matrix, then invert the covariance matrix, and then multiply the input signal vector by the inverse matrix. In accordance with the teachings of this invention, the output vector is estimated by the outputs of a single adaptive filter.

Note is made of the fact that the adaptive filter itself does not produce LMMSE estimates. The LMMSE estimates are produced only after the adaptative filter is followed by a filter matched to the pulse shape of the unknown parameter carrier by the received signal. Another condition is that the estimation be made of a row or column of the inverse (total) covariance matrix, and not of the inverse interference-plus-noise covariance matrix. The adaptive filter described herein may be considered to be a multi-purpose filter which is applied to LMMSE estimation, as an example.

A further step of the method applies the result (filter outputs) to a separate filter matched to a pulse shape of the unknown parameter to be estimated. These two filter together then form an adaptive LMMSE estimator of the unknown parameter. In a presently preferred embodiment the received signal is transmitted from a base station (BS) of a wireless network as a WCDMA signal, and the matched filter is implemented as a RAKE receiver that performs multipath combining at a chip level, as well as single code correlation. In this case the unknown parameter is a data symbol that is transmitted through and received from a wireless channel, such as the WCDMA channel.

Also disclosed is a receiver for receiving a signal from a channel using at least one antenna, where the received signal contains a data signal. The receiver includes an input section, such as an analog to digital converter for sampling the received signal. The receiver further includes a blind adaptive filter, which processes the input samples and generates output samples for further processing, and which converges to a filter coefficient vector that is an estimate of a row or column of an inverse covariance matrix. A RAKE receiver is preferably coupled to the output of the adaptive filter and performs multipath combining at the chip level in combination with a single code correlator.

In these embodiments the RAKE receiver can also be implemented so that it first despreads the multipaths using a code correlator bank, and then performs multipath combining at the symbol level using the correlator outputs.

Overall, the adaptive filter with the described post-processing (pulse shape matched filtering, e.g., a RAKE receiver) functions as an adaptive LMMSE filter that operates without a training sequence. It is shown that the filter coefficients of the adaptive filter converge to a (P+1)'th column or a row of the inverted covariance matrix $(C_{rr}(i))^{-1}$, making complex matrix inversion unnecessary to perform.

This invention provides, for estimation or other purposes, that the required multiplication of an input signal vector by an inverse covariance matrix (total signal covariance matrix or interference-plus-noise covariance matrix) is replaced by linear filtering, where the elements (directly computed or estimated elements) of a row or a column of the inverse covariance matrix corresponding to time instant i are used as filter coefficients. The filter outputs form a vector g(i) that is estimated element by element using the linear filter. Vector g(i) can be used to replace the vector that would have been obtained by directly multiplying the signal vector by the inverse covariance matrix.

The teachings of this invention are not restricted to any specific estimation method (for example, to LMMSE, Maximum Likelihood (ML), etc.), and the filtering need not be adaptive at this general level. This general method may need the actual covariance matrix to be accurately constructed or estimated to be able to estimate a row or column of the inverse matrix, but not necessarily. In that only one row or column is required, a significant reduction in complexity can be obtained.

The invention further provides an extension of the foregoing by applying the novel adaptive filters so that the filter w(i) converges or closely converges to a row or column of the required inverse covariance matrix.

The following two cases can be distinguished. First, if a total signal covariance matrix is required (as in the case of linear minimum MSE, LMMSE, estimation), the input signal of the adaptive filter is the total signal (desired signal plus interference plus noise), and the filter outputs are used to generate output vector g(i). Second, if a noise covariance matrix is required (as for maximum likelihood, ML, estimation), the input signal to the filter is the interference plus noise signal, with the desired signal excluded. This is possible to achieve, for example, when the desired signal is known during a pilot signal period, and can thus be subtracted from the total signal. When the required filter has been found through adaptation, this filter can then be used to replace the required operation of inverting the covariance matrix and multiplying by the input signal vector (also including the desired signal) or some other signal vector by the inverse covariance matrix.

The filter outputs generated in accordance with the foregoing two cases are then employed to estimate unknown parameters, for example, as in LMMSE estimation, by decoupling the adaptive filter with a filter matched to the pulse shape of the unknown parameter carried by the received, sampled signal.

BRIEF DESCRIPTION OF THE DRAWINGS

The above set forth and other features of the invention are made more apparent in the ensuing Detailed Description of the Invention when read in conjunction with the attached Drawings, wherein:

FIGS. 11A and 11B are diagrams that are useful in understanding the operation of the adaptive filter in computing or estimating one row (or column) of the inverse matrix that is then used as a linear filter (FIR filter) for the input signal r(i), wherein FIG. 11A shows the single antenna case, and FIG. 11B shows the two antenna case.

DETAILED DESCRIPTION OF THE INVENTION

Figure 9A:
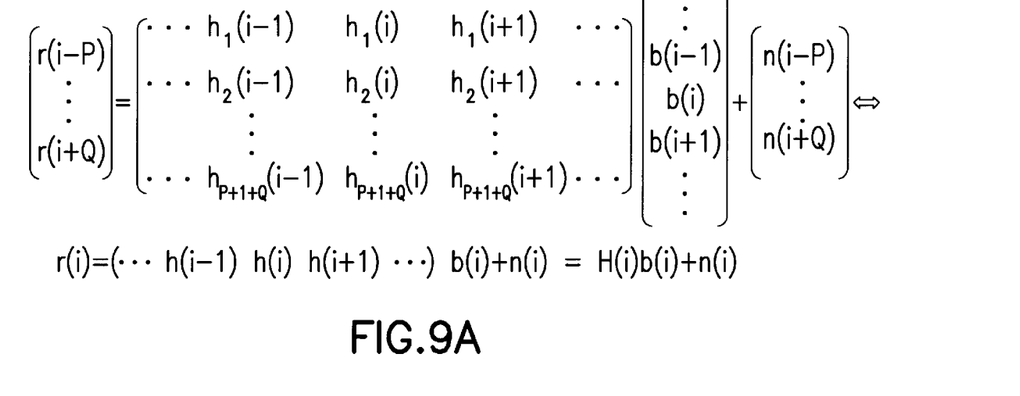
FIGS. 9A–9Q show various mathematical equations that are referenced in the detailed description of this invention.

The following abbreviations are found in the detailed description.
BER Bit Error Rate
BS Base Station
AWGN Additive White Gaussian Noise
FER Frame Error Rate
FIR Finite Impulse Response Filter
LMMSE Linear Minimum Mean-Square-Error
LMS Least-Mean-Square
RAKE Rake
SINR Signal-to-Interference-plus-Noise Ratio
SIR Signal-to-Interference Ratio
WCDMA Wideband Code Division Multiple Access By way of introduction, a system of linear equations is conveniently expressed with a matrix equation as shown in FIG. 9A. This equation models an arbitrary signal. When considering data transmission, vector r(i) may represent the received signal vector including samples around the time interval i of interest. Matrix H(i) is the channel matrix, which may also include pulse shaping and other transmit and receive filters, b(i) is the unknown vector of data symbols, and n(i) is the additive noise-plus-interference vector. No assumptions need be made concerning the nature of the noise vector.

Figure 9B:
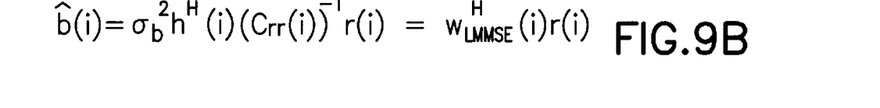
Figure 9C:
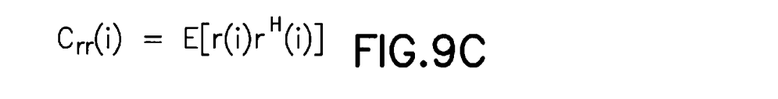

To solve the unknown parameter b(i) given r(i), the optimal linear estimator, in the minimum-mean-square sense (the LMMSE solution), is shown in the Equation of FIG. 9B, in which the covariance matrix of the received signal is of the form shown in FIG. 9C.

Figure 1:
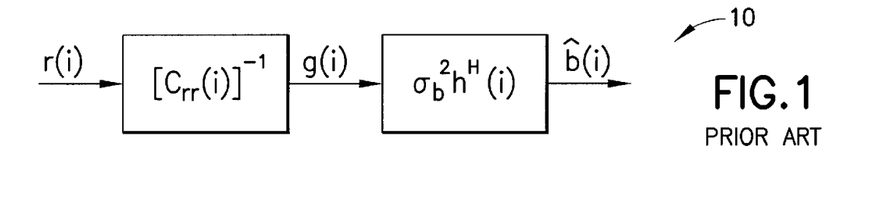
FIG. 1 is a block diagram that illustrates a conventional high complexity, direct solution for a LMMSE estimator that requires multiplication by an inverse matrix.

The symbol $\sigma_b^2$ denotes the power of the unknown parameters (e.g. data symbols), E[] denotes taking the expectation, $O^H$ denotes the conjugate transpose of a matrix, and $O^{-1}$ denotes matrix inversion. The structure of this conventional type of estimator 10 is shown in FIG. 1.

Clearly, the solution for $w_{LMMSE}$ requires matrix inversion and a constant updating of the matrix inverse. However, these operations are too complex for a wireless terminal receiver, using currently available microprocessor technology, to compute in a reasonable amount of time.

After multiplication by the matrix inverse, matched filtering is performed by multiplying the result g(i) with $h^H(i)$ The operation results in an LMMSE estimate of b(i).

Figure 2:
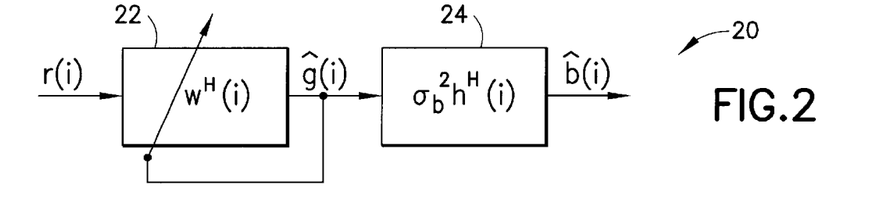
FIG. 2 is a block diagram of an adaptive LMMSE estimator employing an adaptive FIR filter in accordance with the teachings herein.

Provided now is a definition of the general adaptive blind algorithm in accordance with the teachings of this invention. Reference can be made as well to FIG. 2. The blind algorithm finds the optimal LMMSE estimator adaptively, thus avoiding large computational requirements. The adaptive LMMSE solution is divided into two parts, wherein the matrix inversion block in FIG. 1 is replaced with an adaptive filter 22, and the second matched filter block 24 can remain as is. The algorithm is blind in the sense that no training sequence of b(i) is required to train the adaptive filter 22. Instead, the structure of the estimator is such that the output of the adaptive filter 22 itself can be used for training. After the adaptive filter 22 there is preferably another filter matched to the pulse shape, in this case the filter 24.

The adaptive algorithm and method for executing same proceeds as follows.

Figure 9D:
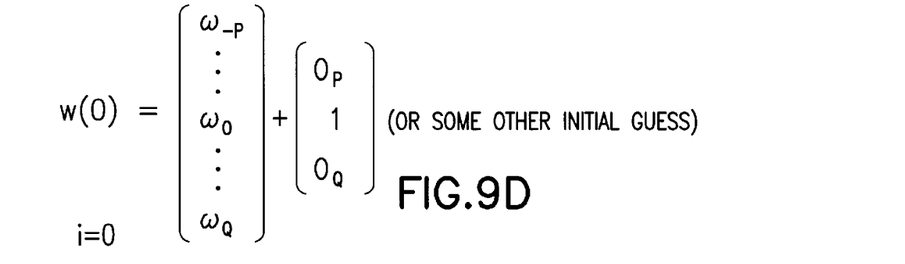
Figure 9E:
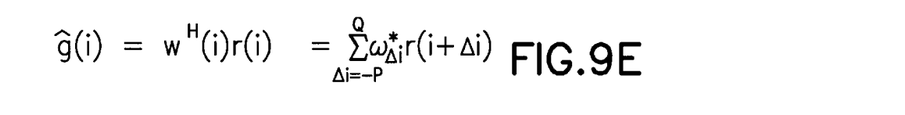

Still referring as well to FIG. 2 for showing a block diagram of the blind adaptive LMMSE estimator 20 in accordance with these teachings, a first step performs filter initiation, as shown in the Equation of FIG. 9D, where $O_N$ is an all-zero column vector of length N A second step computes a new filter output in accordance with the Equation shown in FIG. 9E.

Figure 9F:
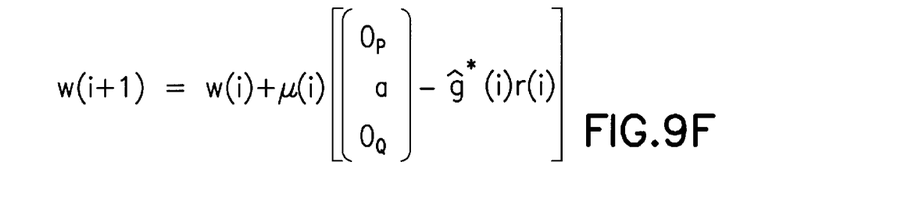

A third step updates the filter coefficients in accordance with the Equation shown in FIG. 9F, where a is a constant that may be set equal to unity.

Figure 9G:
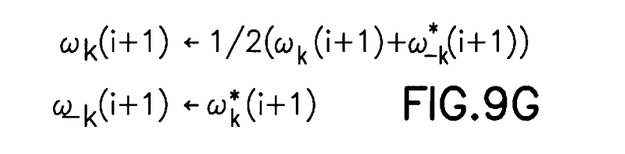

The third step may perform an optional sub-step if the optimal filter is known to be symmetric. In this case the Equation shown in FIG. 9G can be executed.

The fourth step increments the variable i, and the method returns to the second step to again compute the filter output.

Figure 9H:
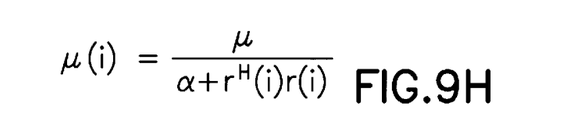
Figure 10:
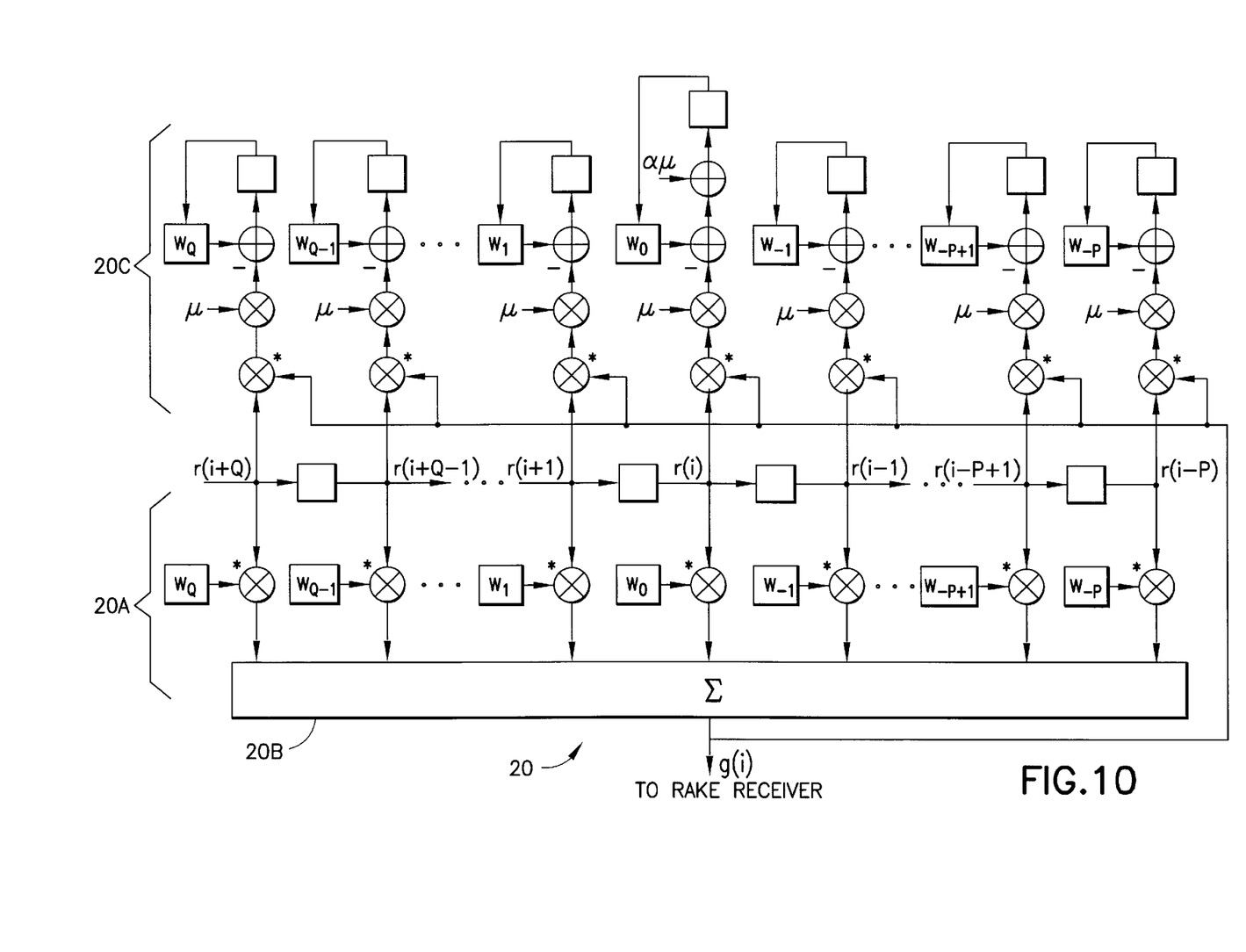
FIG. 10 is a circuit diagram depicting an exemplary hardware implementation of the adaptive filter in accordance with these teachings for the case of one input signal r(i) (one receiver antenna)

In the foregoing description the complex conjugate is denoted by ( )* and $\mu(i)$ is a small, possibly time varying step size parameter. Parameter $\mu(i)$ can be selected to be of the form $2^{-n}$, where n is an integer, for providing an effective hardware implementation (see also FIG. 10). One option for setting the step size parameter is shown in the Equation of FIG. 9H, which results in a normalized adaptive algorithm. The parameter $\alpha$ is a constant to ensure that the divisor cannot become arbitrarily small, while the parameter $\mu$ can be a constant or selected according to the speed with which the signal model changes (e.g., the fading speed). The filter length is P+1+Q taps, which is the same as the length of input vector r(i) (see, again, FIG. 10).

The adaptive LMMSE estimator 20 includes the adaptive filter 22 and the filter 24 that is matched to the received pulse shape. The vector w(i) is an estimate of a row (or column) of the matrix inverse (FIG. 9C) corresponding to time interval i. The vector g(i) of FIG. 1 is estimated element by element by the resulting linear filter. After forming an estimate of the full vector g(i) the second operation shown in the second block of FIG. 1 can be performed. It is shown below that this second operation can be implemented as a conventional or a modified RAKE receiver.

The RAKE receiver can be based, for example, on one described in Wideband CDMA for Third Generation Mobile Communications, pp 46–47, Artech House, 1998, T. Ojanperä, R. Prasad (editors) and/or one described by J. Proakis: Digital Communications, $3^{rd}$ edition, pp 797–800, McGraw-Hill, 1995. The former provides a more practical and the latter a more theoretical description. The RAKE employed herein uses multipath combining at the chip level followed by a single code correlator. While this specific implementation is not shown in the references, it is known that the order of linear operations can be exchanged.

It can be shown that the adaptive filter coefficients converge to the (P+1)'th column of the inverted signal covariance matrix $(C_{rr}(i))^{-1}$. Thus, in accordance with an aspect of these teachings the need for the complex matrix inversion in Equation (1), shown in FIG. 9B, is avoided. In practice, the conventional consideration of $n^2$ elements is reduced to the consideration of only n elements, which provides a substantial improvement in execution time.

A description will now be provided of an embodiment of the adaptive algorithm for use with multiple input signals (antennas). Assume first the presence of two possibly correlated received signals (e.g., from two receiver antennas). An extension of these teachings for use with more than two input signals is straightforward, based on the ensuing description. In the following description additional subscripts are used to refer to the index of the input signal vector (or antenna) or to the index of the filter vector.

Figure 3:
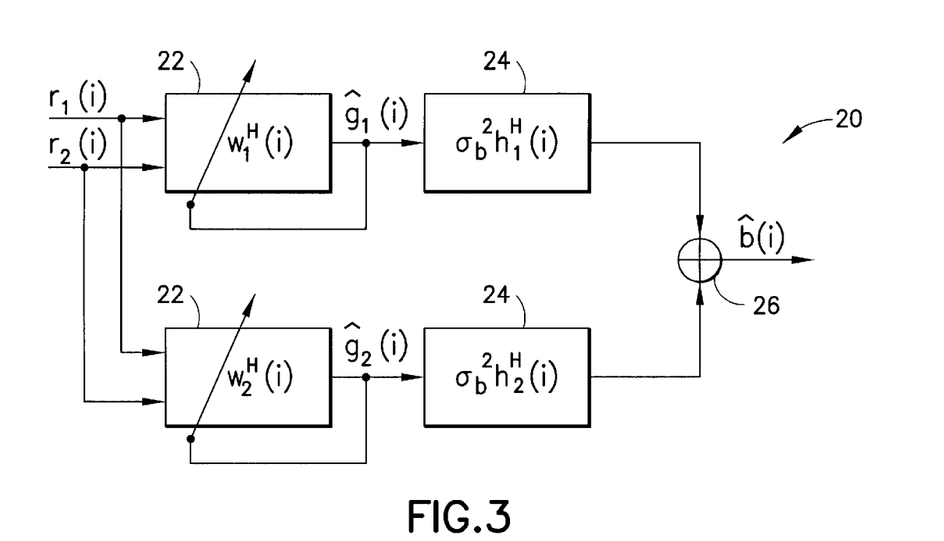
FIG. 3 is a block diagram of a multi-signal adaptive LMMSE estimator employing an adaptive FIR filter in accordance with the teachings herein.

The method for use with multiple input signals (e.g., receiver antennas) proceeds as follows. Reference is also made to FIG. 3, which shows the structure of the adaptive LMMSE estimator 20 adapted for use with two input signals $r_1(i)$ and $r_2(i)$. In this case the adaptive LMMSE estimator 20 includes two adaptive filters 22 and two associated filters 24, each of which is matched to the received pulse shape. The filters 24 could be RAKE-type filters. A summation junction 26 is provided at the outputs of the pulse shape filters 24.

Figure 9I:
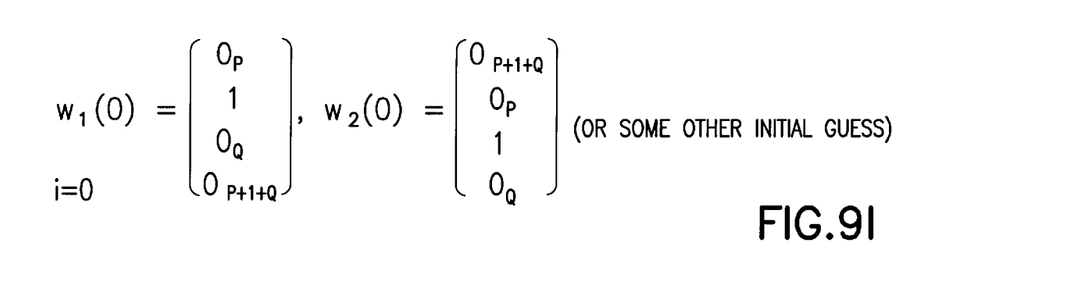

In the first step the adaptive filters 22 are initialized, as shown in the Equation of FIG. 9I, where $O_N$ is an all-zero column vector of length N.

Figures 9J, 9K:
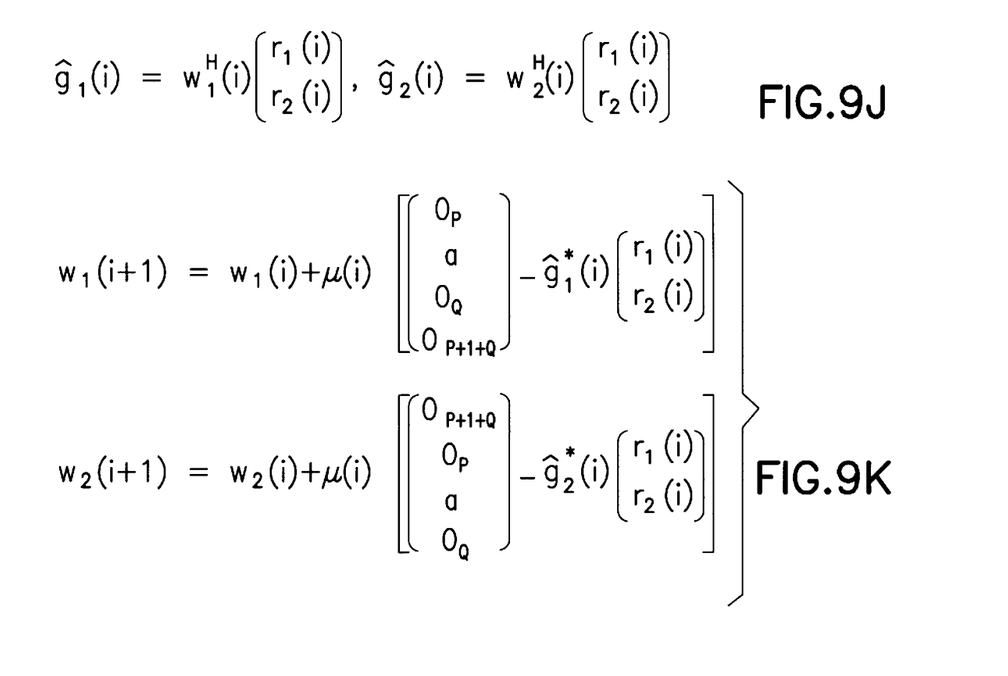

In the second step the method computes new adaptive filter outputs in accordance with the Equation shown in FIG. 9J.

In the third step the method updates the filter coefficients as shown in FIG. 9K, where a is a constant that can be set to unity.

The fourth step increments the variable i, and the method returns to the second step to again compute the filter output.

Having thus described the blind adaptive algorithm in accordance with this invention, a description of the use of the algorithm in the exemplary WCDMA application is now provided.

Figure 9L:
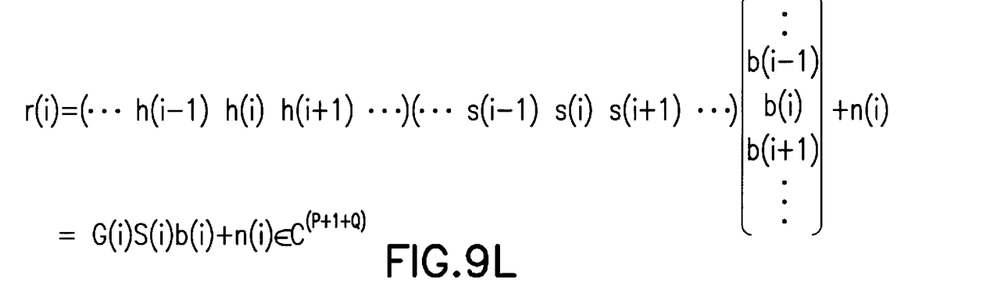

For the WCDMA application the received signal model is shown in the Equation of FIG. 9L, where matrix G(i) is now the channel matrix whose columns h(i) represent the channel impulse responses and the chip pulse shapes for each transmitted chip of a particular user. Assuming the use of at least one sample per chip, a typical size of the covariance matrix is 10×10 or larger. The user's associated time varying short spreading code is given by the columns of matrix S(i). The time variance is due to the long scrambling code used in the WCDMA system. Channel symbols to be estimated by the adaptive filter 20 are stacked into vector b(i).

Due to the use of the scrambling code, as was discussed previously, the adaptive filter 20 cannot be trained by using a known sequence of symbols b(i). In addition, the adaptive filter 20 cannot be successfully trained by using some known sequence of user's chips S(i)b(i) (e.g. from a common pilot channel). This is true because the signal is only a fraction of the overall downlink signal due to the typically high number of users in the system, resulting in too slow of an adaptation speed. Because the signal model is equivalent to the earlier described model with definition H(i)=G(i)S(i), the adaptive filter 20 in accordance with the teachings of this invention can be applied directly. The direct LMMSE solution has the form shown in the Equation of FIG. 9Q.

In this equation, the vector $s^H(i)G^H(i)$ is equivalent to a RAKE receiver where multipath combining is performed at the chip level, after which a single code correlator is used. The order of these operations can also be reversed, i.e., the signal can first be fed to a code correlator bank after which the multipath combiner is applied. It should be noted that the channel estimates which the RAKE receiver uses for multipath combining are estimated using the signal before the adaptive filter 20.

Figure 4:
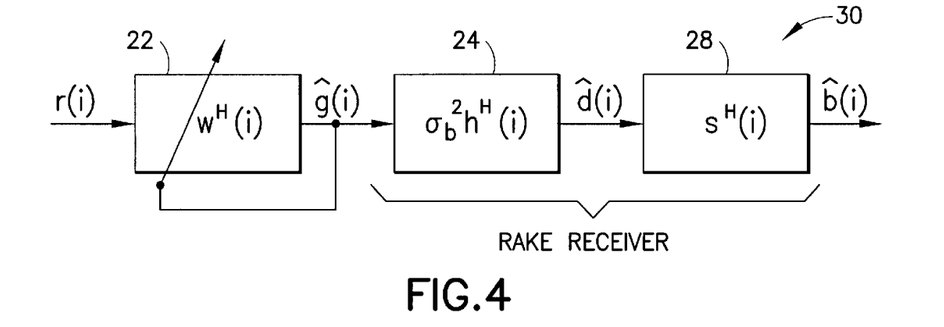
FIG. 4 is a block diagram depicting the use of a presently preferred adaptive algorithm applied to an adaptive LMMSE receiver in a WCDMA downlink.

Because the matrix inverse operation in the conventional LMMSE solution is replaced by the adaptive filter 20 in accordance with the teachings of this invention, the adaptive LMMSE receiver structure 30 shown in FIG. 4 is obtained, wherein the filter blocks 24 and 28 implement the RAKE receiver, as discussed above.

The adaptive algorithm and resulting filter 22 described above has been applied in a WCDMA terminal receiver, and its performance has been evaluated through the use of computer simulations. The performance was compared to the performance obtained using only the conventional RAKE receiver. The simulation environment models a complete WCDMA downlink based on the UTRA specification. The simulation environment assumed the presence of the following parameters and conditions: one receiver antenna, a fading multipath channel (a modified Vehicular A channel, 50 km/h), channel estimation, fast closed-loop power control, rate ⅓ convolutional channel encoding, geometrical modeling using G parameter, spreading factor 32, and a desired user plus 19 interfering equal-power users.

The novel adaptive LMMSE receiver 30 is implemented by applying the blind adaptive FIR filter 22 prior to the RAKE receiver (blocks 24 and 28 of FIG. 4) and by modifying the SIR estimator for use of the advanced receiver. SIR estimation was accomplished using the output of the adaptive filter 22.

Figure 5:
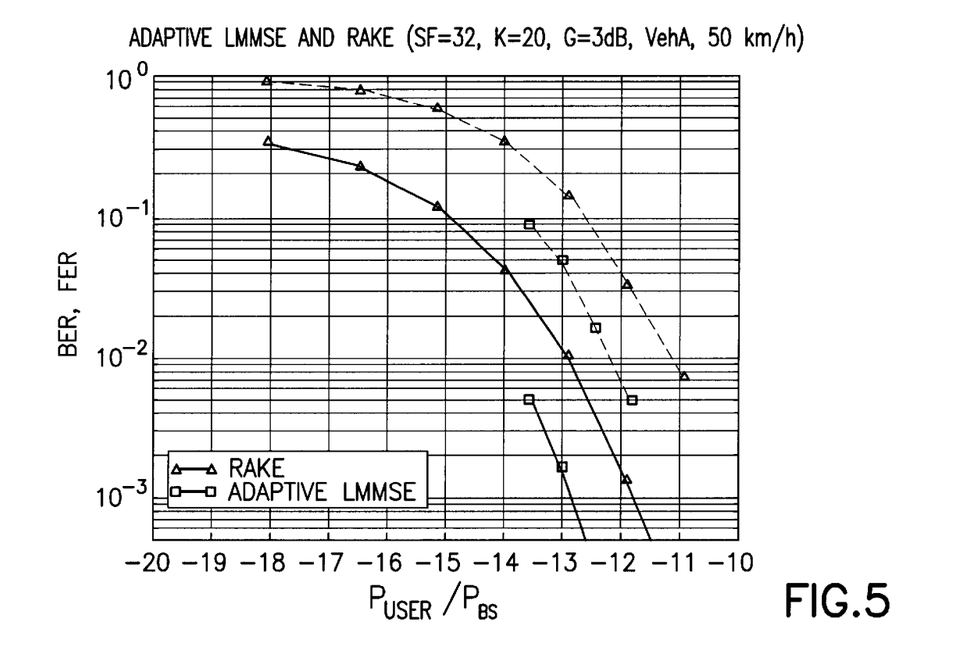
FIG. 5 is a graph that shows the receiver and RAKE in a vehicular A channel with G=3 dB, where the BER is shown with a solid line and the FER is shown with a dashed line.
Figure 6:
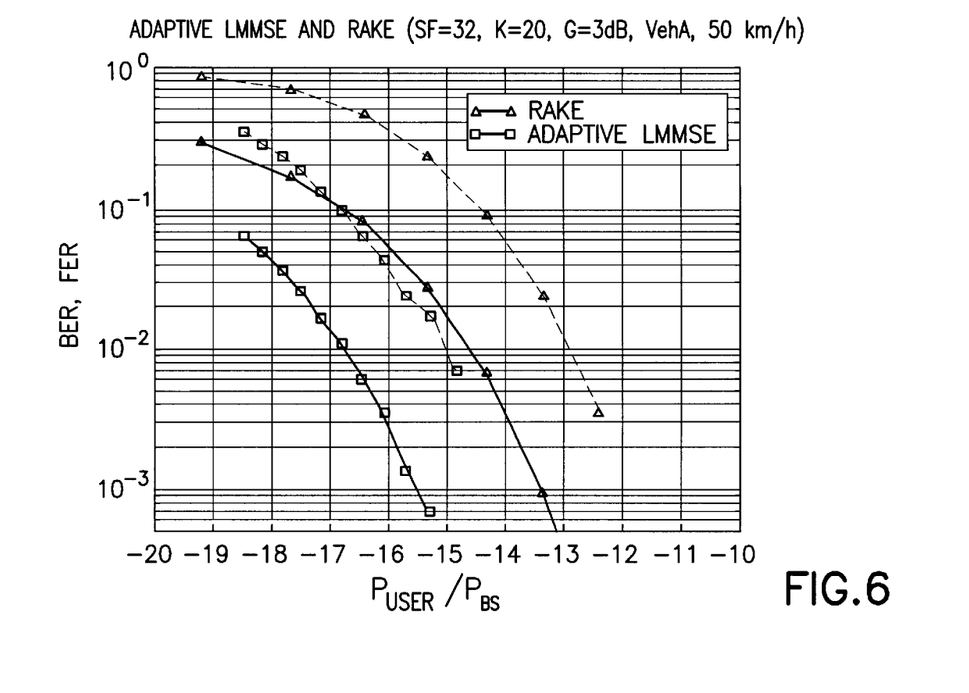
FIG. 6 is a graph that shows the receiver and RAKE in a vehicular A channel with G=9 dB, where the BER is shown with a solid line and the FER is shown with a dashed line.
Figure 7:
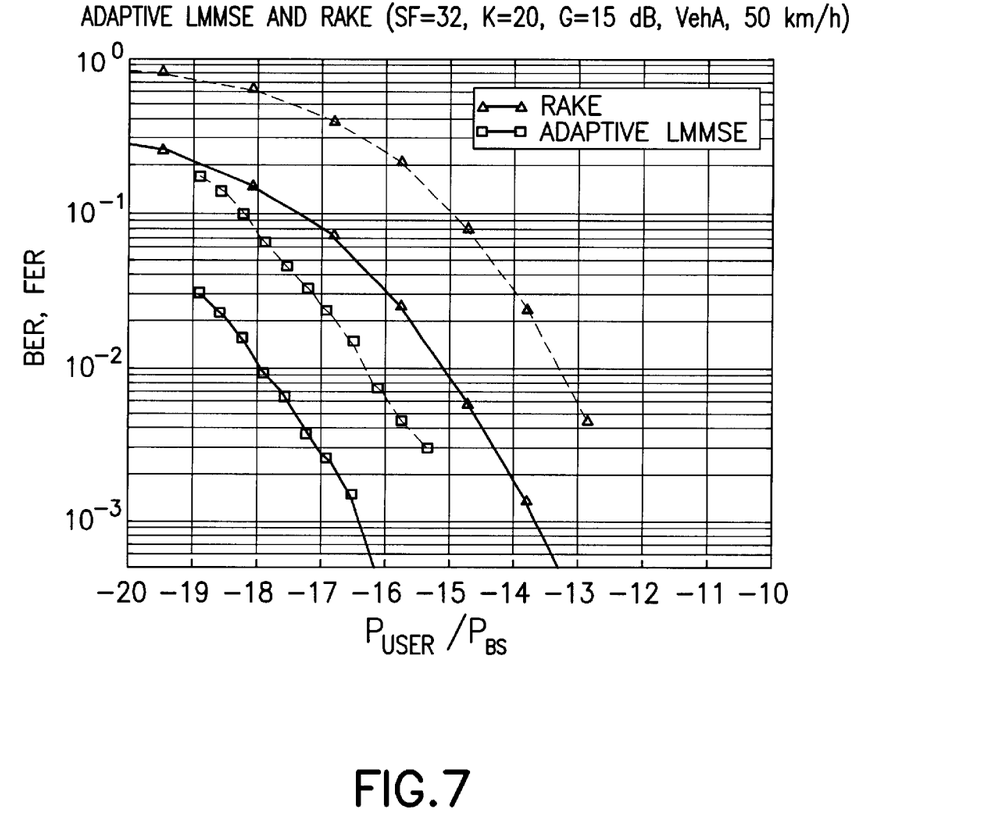
FIG. 7 is a graph that shows the receiver and RAKE in a vehicular A channel with G=15 dB, where the BER is shown with a solid line and the FER is shown with a dashed line.

A performance comparison is shown in FIGS. 5–7, and a summary of the results is shown in Table 1. Note that gains measured with $E_b/N_0$ are the same. Table 1 shows the gain (measured as a reduction in transmitted power for the desired user) due to the use of the adaptive LMMSE receiver 30, as compared to a RAKE receiver in the WCDMA downlink, assuming a Vehicular A channel, 50 km/h.

TABLE 1

|  | Gain @ FER = $10^{-1}$ | Gain @ BER = $10^{-3}$ |
| --- | --- | --- |
| G = 3 dB | 1.0 dB | 1.1 dB |
| G = 9 dB | 2.5 dB | 2.2 dB |
| G = 15 dB | 3.2 dB | 2.9 dB |

The G parameter gives the relation of the total BS transmit power to the additive white Gaussian noise (AWGN) power at the WCDMA receiver. If G is increased, and the total BS transmit power is fixed, then the AWGN power is decreased. The parameter value depends on the distance of the receiver from the BS and on the average propagation loss as a function of distance. When the relative proportion of the white noise is reduced, the gain from using the LMMSE receiver 30 increases. This is true because no known type of receiver can compete against white, nonstructured noise with a fixed number of receiver antennas.

It should be noted that interference from neighboring BS's has not been taken into account. When this inter-cell interference increases, the gain from the adaptive receiver 30, compared to the conventional RAKE receiver, also increases. The inter-cell interference is at its maximum at the cell edge and, thus, it compensates for the gain loss caused by decreasing G when the WCDMA wireless terminal moves towards the cell edge. When additional receiver antennas are used the receiver is also able to optimally or near-optimally adapt to the spatially colored interference, in addition to the temporally colored interference, which is expected in order to further increase the gain compared to the conventional RAKE receiver (with the same number of receive antennas).

A second embodiment of the adaptive filter 20 will now be described. While the second embodiment of the adaptive filter is not as stable as the first embodiment described above, tests conducted with a CDMA signal have shown that the adaptive filter 20 in accordance with the second embodiment is also well suited for use in a CDMA system, and in particular with a WCDMA system. In the filter of the second embodiment the adaptation is loosely based on a so-called matrix inversion lemma. Related to the Recursive Least Square (RLS) algorithm, this method may exhibit a faster adaptation speed than the first embodiment of the adaptive filter 20. The RLS algorithm is known to have a faster adaptation speed than the relatively more simple LMS-type algorithms, such as LMS, Griffiths' algorithm, etc. The RLS algorithm applies the so-called matrix inversion lemma.

Figure 9M:
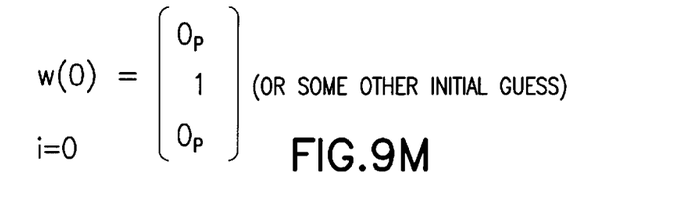

In the first step the adaptive filter 22 is initialized, as shown in the Equation of FIG. 9M, where $O_N$ is an all-zero column vector of length N.

Figure 9N:
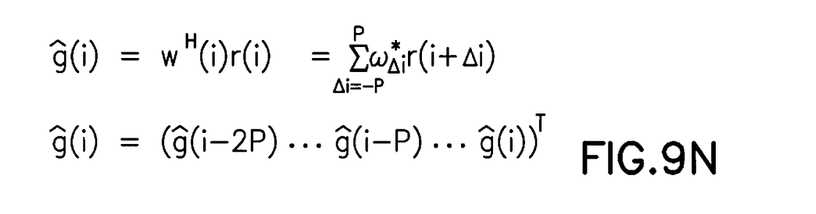

In the second step the method computes a new adaptive filter output in accordance with the Equation shown in FIG. 9N.

Figure 9O:
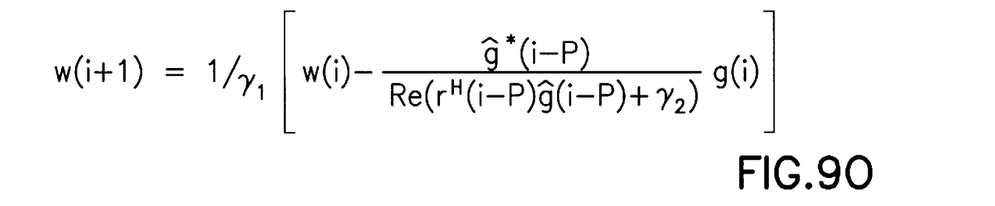

In the third step the method updates the filter coefficients as shown in FIG. 9O, where Re refers to the Real part.

Figure 9P:
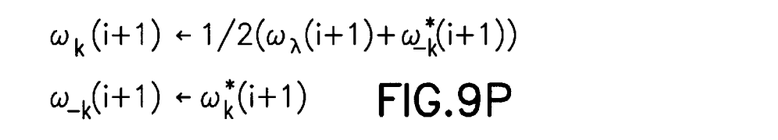
Figure 9Q:
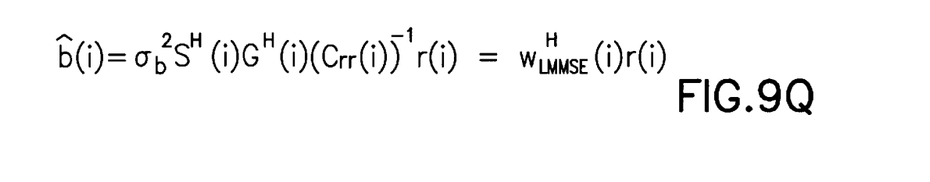

The third step may perform an optional sub-step if the optimal filter is known to be symmetric. In this case the Equation shown in FIG. 9P can be executed.

The fourth step increments the variable i, and the method returns to the second step to again compute the filter output.

The parameters $\gamma_1$ and $\gamma_2$ are real factors which are constant or are made to vary slowly according to the speed with which the signal model changes (e.g. according to the fading speed). These two parameters may be referred to as "forgetting factors" which cause the adaptive filter 20 to gradually forget past conditions when in a changing environment. These forgetting factor parameters can be defined in several ways, such as $\gamma_1=\gamma$ and $\gamma_2=\gamma/\text{SQRT}(1-\gamma^2)$ where $\gamma$ is close to but less than 1).

The adaptive filter 20 can be implemented in hardware and followed by a conventional or a modified RAKE receiver. Reference in this regard can be had to FIG. 10, which shows a hardware implementation of the adaptive filter 20 for one input signal r(i) (one receiver antenna) which, in practice, will typically be comprised of Inphase (I) and Quadrature (Q) components. The lower portion of the Figure shows the complex coefficients part 20A and a summation block 20B that outputs the complex scalar vector value g(i), while the upper part of the Figure illustrates the adaptive part 20C of the filter 20. In the diagram an empty block denotes a delay element of one input sample interval (e.g., one sample or more per chip), a block that contains a symbol denotes a memory element or a register, * denotes taking the complex conjugate, and $\mu$ denotes the step size parameter.

Figure 8:
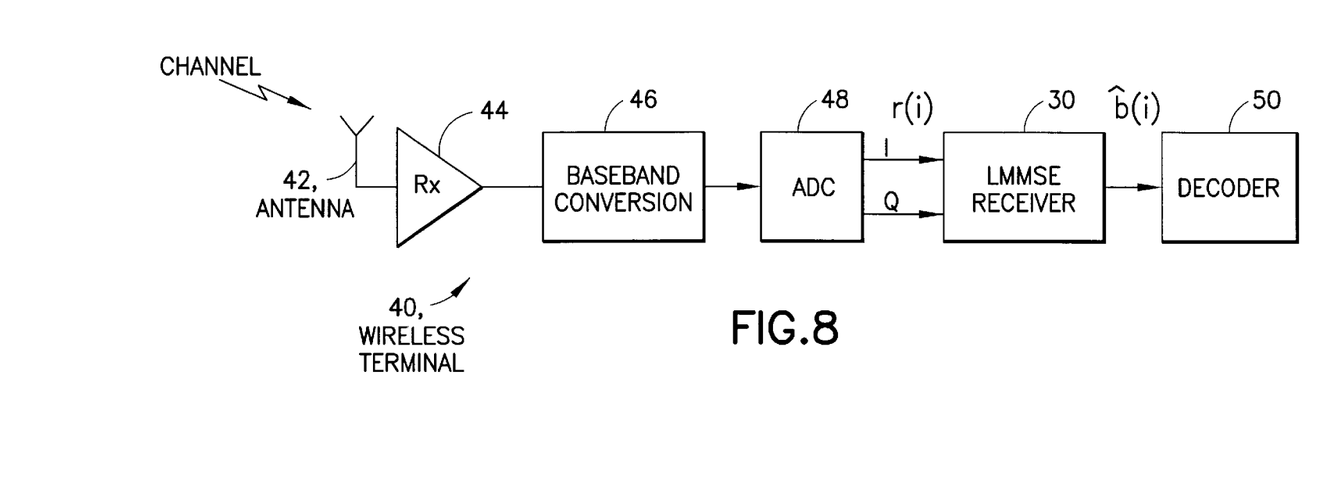
FIG. 8 is a partial block diagram of a wireless terminal that includes the LMMSE estimator in accordance with the teachings herein, wherein the operation of multiplying by a matrix inverse, as in FIG. 1, is replaced by an adaptive linear (transversal) filter.

FIG. 8 is a block diagram of a portion of a wireless terminal 40 that includes the adaptive FIR (LMMSE) receiver 30 in accordance with this invention. At least one antenna 42 receives a signal from a channel and applies the received signal to an input of an RF receiver (Rx) 44. The receiver 44 feeds a baseband conversion block 46 wherein the received RF signal is demodulated to baseband and processed as needed to form a baseband signal. The baseband signal is applied to an analog to digital converter (ADC) 48 that samples the (analog) baseband signal (for example, at the chip rate or some multiple of the chip rate) and which outputs I and Q samples. These samples are operated on by the adaptive LMMSE receiver 30 as was described above. Estimates of the received data symbols are applied to a decoder 50 for obtaining the transmitted data bits. The antenna 42, receiver 44, baseband conversion block 46, ADC 48 and the decoder 50 may all be conventional in construction, and may be suitable for operation in the WCDMA system, or in any other suitable system. For example, some TDMA systems may benefit as well from the teachings of this invention.

Figure 11A:
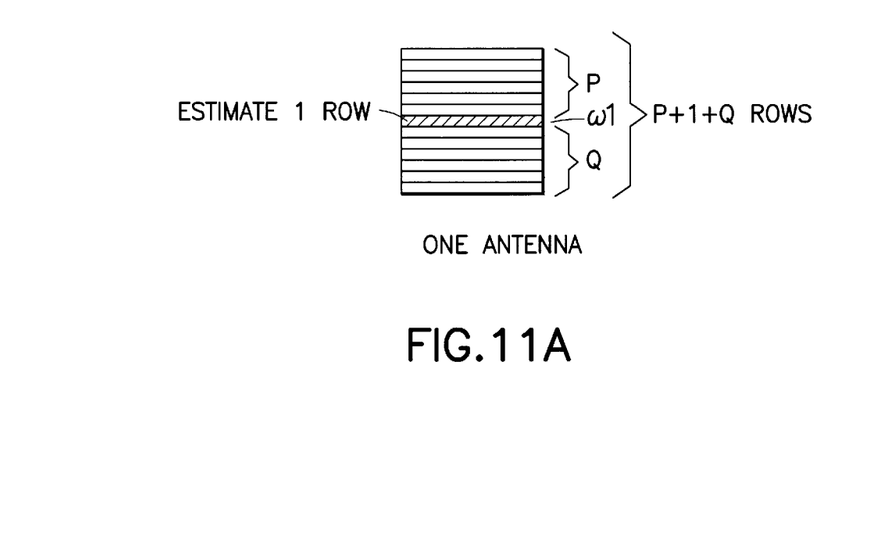
Figure 11B:
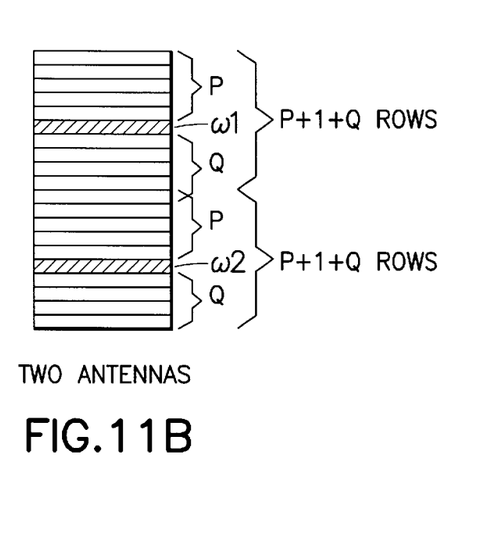

The teachings of this invention provide an adaptive filter 20 that is clearly superior to the conventional adaptive filter shown in FIG. 1. Instead of requiring the multiplication operation by the inverse of the covariance matrix, a column (or a row) w of the inverse matrix is computed or estimated and is then used as a linear filter (FIR filter) for the input signal r(i). Reference in this regard can be had to FIG. 11A for the single antenna case, and to FIG. 11B for the two antenna case. This type of operation thus beneficially eliminates the multiplication by the inverse of the covariance matrix and, even more significantly, when one of the blind adaptive filters described above are employed, eliminates the very computationally demanding operation of matrix inversion.

Note should be made of the possible symmetry of the adaptive filter 20 with respect to the middle filter coefficient $w_o$.

If the adaptive filter portion 20 of the receiver 30 is by-passed for some reason, for example to save power when experiencing good channel conditions, the receiver 30 then functions as a conventional RAKE receiver.

It is pointed out that although the possible symmetry of the filter (i.e., filter coefficients are known to satisfy ($w_{-k}=w_k^*$) can be utilized in adaptation, the filter need not be symmetric in order to be operative, and the teachings of this invention are thus not limited for use with only symmetric filters. This is an important point, as the filter symmetry does not hold, for example, if multiple receiver antennas are used. Also, when $P \neq Q$ for some reason (e.g., because of filter delay constraints), the symmetry may hold with respect to the P+1'st tap, but only with reasonable accuracy. Clearly, in this case some of the filter coefficients are unpaired, and the symmetry property cannot be utilized in the adaptation of those coefficients. However, selecting P=Q is a most reasonable way of selecting parameters. A desirable property of the inverse covariance matrix, in terms of filter symmetry, is that it is at least close to a so-called Toeplitz matrix. This is generally the case if the matrix is large enough (i.e., P+1+Q is large enough) and only one antenna is used.

It is also pointed out that the adaptive algorithm of this invention is not limited to only the disclosed WCDMA reception embodiment, but can be generally employed in various applications where LMMSE or some other type of estimation, such as Maximum Likelihood (ML) estimation, is performed or is desirable. For ML estimation, the covariance matrix involved is generally the covariance matrix of the additional (interference-plus-)noise, not the covariance of the total received signal which also includes the desired signal component. The teachings of this invention, including the adaptive algorithms, can also be applied to the estimate a row or column of the inverse noise covariance matrix for efficient implementation of an ML estimator. The filter coefficients of the presently preferred embodiments of the blind adaptive filters can be separately used to filter the total input signal (which also includes the desired signal component) as is required by theory of ML estimation.

Furthermore, the channel through which the signal is received and sampled need not be a wireless channel. Also, it should be noted that the use of this invention is not restricted to the downlink (base station to mobile station), but could be applied as well in the uplink direction (mobile station to base station).

Thus, while the invention has been particularly shown and described with respect to preferred embodiments thereof, it will be understood by those skilled in the art that changes in form and details may be made therein without departing from the scope and spirit of the invention.

What is claimed is:

1. A method to process an input signal, comprising steps of:

forming a covariance matrix from samples of the input signal;

forming a vector w(i) that is an estimate of a row or a column of the inverse of the covariance matrix corresponding to a time interval i of a received signal to form a linear filter;

forming a vector g(i) that is estimated element by element using the linear filter; and applying the vector g(i) to a filter matched to a pulse shape of an unknown parameter to be estimated to generate an estimate of the unknown parameter.

2. A method as in claim 1, wherein the input signal is transmitted to or from a base station of a wireless network as a WCDMA signal, and where the matched filter is comprised of a RAKE receiver.

3. A method as in claim 2, wherein the RAKE receiver performs multipath combining at a chip level and single code correlation.

4. A method as in claim 2, wherein the RAKE receiver performs despreading using a code correlator bank, and multipath combining at the symbol level using the correlator outputs.

5. A method as in claim 1, wherein the unknown parameter is comprised of a data symbol that is transmitted through and received from a wireless channel.

6. A receiver for receiving a signal from a channel using at least one antenna, the received signal containing a data signal, comprising signal processing means for forming a covariance matrix from samples of an input signal, for forming a vector w(i) as an estimate of a row or a column of the inverse of the covariance matrix that corresponds to a time interval i of the received signal to form a linear filter, and for adaptively processing the input signal with the linear filter to form a vector g(i) that is estimated element by element using the linear filter, the receiver further comprising a matched filter coupled to an output of said signal processing means, said matched filter being matched to a pulse shape of an unknown parameter that conveys said data signal for generating an estimate of the unknown parameter.

7. A receiver as in claim 6, wherein the input signal is transmitted to or from a base station of a wireless network as a WCDMA signal, and where the matched filter is comprised of a RAKE receiver.

8. A receiver as in claim 7, wherein the RAKE receiver performs multipath combining at a chip level in combination with single code correlation.

9. A receiver as in claim 7, wherein the RAKE receiver performs despreading using a code correlator bank, and multipath combining at the symbol level using the correlator outputs.

10. A receiver as in claim 6, wherein said signal processing means functions as an adaptive Linear Minimum Mean Square Error (LMMSE) filter.

11. method for processing an input signal, comprising steps of:

replacing a multiplication of an input signal vector by an inverse covariance matrix by linear filtering, where the inverse covariance matrix is one of a total signal covariance matrix or an interference-plus-noise covariance matrix, wherein directly computed or estimated filter elements of a row or a column of the inverse covariance matrix, corresponding to time instant i, are used as linear filter coefficients;

forming a vector g(i) from the filter outputs, the vector g(i) being estimated element by element using the linear filter; and using the vector g(i) in place of a vector that would have been obtained by directly multiplying the signal vector by the inverse covariance matrix;

wherein for the case where the covariance matrix is the interference-plus-noise covariance matrix, when a desired filter is found through adaptation, the desired filter is used to filter the total signal, including the desired signal, to generate the output vector g(i), and, wherein the filter outputs generated using either of the total signal covariance matrix or the interference-plus-noise covariance matrix are employed to estimate an unknown parameter through the use of a further filter matched to the pulse shape of the unknown parameter carried by the input signal.

12. A method as in claim 11, wherein the unknown parameter is a data symbol.

13. A method as in claim 11, wherein the unknown parameter is a data symbol sent through a WCDMA channel.

14. A method as in claim 12, where the further filter is comprised of a RAKE receiver that performs multipath combining at a chip level and single code correlation.

15. A method as in claim 12, where the further filter is comprised of a RAKE receiver that performs despreading using a code correlator bank, and multipath combining at the symbol level using the correlator outputs.

* * * * *